United States Patent [19]

Mirra et al.

[11] Patent Number: 5,571,877
[45] Date of Patent: Nov. 5, 1996

[54] METHOD OF PREPARING LOW OR MEDIUM-DENSITY STRAIGHT-CHAIN POLYETHYLENE, AND CATALYSTS SUITABLE FOR THIS PURPOSE

[75] Inventors: Mauro Mirra, Biella-Vercelli; Renzo Invernizzi, Milan; Francesco Masi, Milan; Antonio Bani, Milan, all of Italy

[73] Assignee: Enichem Base S.p.A., Palermo, Italy

[21] Appl. No.: 436,645

[22] Filed: May 8, 1995

Related U.S. Application Data

[63] Continuation of Ser. No. 279,838, Jul. 25, 1994, abandoned, which is a continuation of Ser. No. 4,321, Jan. 14, 1993, abandoned, which is a continuation of Ser. No. 905,155, Jun. 25, 1992, abandoned, which is a continuation of Ser. No. 800,760, Dec. 2, 1991, abandoned, which is a continuation of Ser. No. 664,476, Mar. 4, 1991, abandoned, which is a continuation of Ser. No. 38,999, Apr. 16, 1987, abandoned, which is a continuation-in-part of Ser. No. 38,626, Apr. 15, 1987, abandoned.

[30] Foreign Application Priority Data

Apr. 17, 1986 [IT] Italy ........................ 20123/86

[51] Int. Cl.$^6$ ................ C08F 4/654; C08F 10/02
[52] U.S. Cl. ............. 526/64; 502/125; 502/134; 526/119; 526/124.8; 526/348.6
[58] Field of Search ............. 526/125, 64, 119, 526/124.8; 502/125, 134

[56] References Cited

U.S. PATENT DOCUMENTS 3,723,403  3/1973  Greaves et al. .
4,347,162  8/1982  Invernizzi et al. ............ 526/125
4,421,674  12/1983  Invernizzi et al. ............ 526/125
4,481,342  11/1984  Invernizzi et al. ............ 526/125
4,621,124  11/1986  Neyer et al. ................. 526/125
4,762,898  8/1988  Matsuura et al. ............. 526/125

FOREIGN PATENT DOCUMENTS 60-36509  2/1985  Japan .
828828    2/1960  United Kingdom .
2132214   7/1984  United Kingdom .
2134121   8/1984  United Kingdom .

OTHER PUBLICATIONS

Kirk–Othmer, Encyclopedia of Chemical Technology, Third Edition, vol. 16, pp. 384–401.

Primary Examiner—Edward J. Smith
Attorney, Agent, or Firm—George P. Hoare, Jr.; Rogers & Wells

[57] ABSTRACT

Low or medium-density straight-chain ethylene polymers are prepared by copolymerising ethylene with a $C_4$–$C_6$ alpha-olefin at elevated temperature and pressure in a tubular reactor and in the presence of a Ziegler-type catalyst comprising a trialkyl aluminium as co-catalyst and a solid component, the solid component being obtained:

- by spray-drying an ethanolic solution of magnesium chloride to obtain a solid substrate of magnesium chloride particles containing alcoholic hydroxyls,
- by reacting the substrate with titanium tetrachloride to form an activated substrate, and
- by reacting the activated substrate with an alkyl aluminium chloride to chlorinate the titanium and partially or completely reduce the titanium from the tetravalent to the trivalent state.

16 Claims, No Drawings

METHOD OF PREPARING LOW OR MEDIUM-DENSITY STRAIGHT-CHAIN POLYETHYLENE, AND CATALYSTS SUITABLE FOR THIS PURPOSE

This is a continuation of Ser. No. 08/279,838, filed Jul. 25, 1994, now abandoned, which is a continuation of Ser. No. 08/004,321, filed Jan. 14, 1993, now abandoned, is a continuation of application Ser. No. 07/905,155 filed Jun. 25, 1992, which is a continuation of application Ser. No. 07/800,760, filed Dec. 2, 1991, now abandoned, which is a continuation of application Ser. No. 07/664,476, filed Mar. 4, 1991, which is a continuation of application Ser. No. 07/038,999, filed Apr. 16, 1987, which in turn is a continuation-in-part of application Ser. No. 07/038,626, filed Apr. 15, 1987, now abandoned.

The invention relates to preparation of low or medium-density straight-chain ethylene polymers by a method of polymerization at elevated temperature and pressure in a tubular reactor and in the presence of a particular Ziegler type catalyst. The invention also relates to the catalyst used in the polymerization process.

Some straight-chain ethylene polymers known in the art and having a density of about 0.915 to about 0.935 are obtained by copolymerising ethylene with smaller quantities of a $C_4$–$C_8$ alpha-olefin and operating at from low to medium pressures by the gas-phase technique (fluidized or agitated bed) or in the liquid phase (solution or suspension), usually with Ziegler-type catalysts, e.g. as described in Kirk-Othmer, "Encyclopedia of Chemical Technology", 3Ed, Vol. 16, 1981, pages 385–401.

It is also known to use Ziegler-type catalysts to polymerise ethylene or copolymerise ethylene with an alpha-olefin, operating at elevated temperatures (usually higher than about 120° C.) and elevated pressures (usually higher than about 1,000 bars), likewise in tubular reactors and in conditions similar to those used in the art for preparing low-density polyethylene using radical initiators. See description in BPS 828 828, U.S. Pat. No. 3,723,403 and FPA 8320009. The Ziegler catalysts used for this purpose usually comprise a titanium halide and an alkyl aluminium and can also comprise a substrate.

However, the use of Ziegler catalysts in a method of polymerizing ethylene at elevated temperature and pressure results in a number of problems which have not yet been satisfactorily solved.

These problems are due mainly to the difficulty of controlling the polymerization kinetics of the catalyst, which must act at the maximum level during the short polymerization time, and the instability of the alkyl aluminium used as co-catalyst, which may give rise to undesired reactions. When these problems are not adequately solved, the polymerization yields are undesirably low and the resulting polymer is contaminated with a high content of catalyst residues.

Another problem inadequately solved in the art consists in giving the catalyst a physical form making it easy to use in an environment kept at elevated pressure and temperature.

The object of the invention is to overcome the aforementioned disadvantages by using a catalyst comprising a solid component in a particular physical form and a trialkyl aluminium having a short alkyl chain as co-catalyst, the catalyst being highly active and productive, with very few inactivating effects and little tendency to decomposition or formation of by-products under the typical polymerization conditions in the tubular reactor art.

According to the invention, therefore, low or medium-density polyethyelenes are produced by copolymerising ethylene with a $C_4$–$C_6$ alpha-olefin operating at elevated temperatures and pressures in a tubular reactor and in the presence of a Ziegler-type catalyst, the catalyst comprising a trialkyl aluminium having a short alkyl chain as co-catalyst and a solid component, the solid component being obtained:

by spray-drying an ethanolic solution of magnesium chloride to form a substrate of solid particles of magnesium chloride containing alcoholic hydroxyls, at least 70% by weight of the particles having a size in the range from 0.5 to 10 microns and the alcoholic hydroxyl content varying from 3 to 15% by weight expressed as ethanol;

by reacting the substrate with titanium tetrachloride to form an activated substrate having a bonded titanium content of 0.8 to 4.0% by weight, expressed as metal, and an alcoholic hydroxyl content of 0.02 to 4% by weight expressed as ethanol, and by reacting the activated substrate with an alkyl aluminium chloride having an atomic ratio of 2/1 to 20/1 between the aluminium in the alkyl aluminium chloride and the titanium in the activated substrate, at a temperature of 0° C. to 120° C. and for a time from 100 hours to 15 minutes, to chlorinate the titanium and partially or completely reduce the titanium from the tetravalent state to the trivalent state and to obtain the solid catalyst component, the atomic ratio between the aluminium in the trialkyl aluminium and the titanium in the solid catalyst component being equal to or greater than 15/1.

Preparation of the substrate

The catalyst substrate is prepared by spray-drying an ethanolic solution of magnesium chloride.

As is known, spray-drying is a technique by means of which a solution of a solute in an evaporatable solvent is sprayed to form droplets of finely-divided liquid and the droplets are placed in contact with an inert (non-reactive) hot gas which flows in co-current or counter-current to the droplets, thus evaporating the solvent and separating the solute in the form of solid particles, generally spherical and of relatively uniform dimensions.

According to the invention, spray-drying is brought about under conditions such as to obtain magnesium chloride having an alcoholic hydroxyl content within a precise range of values. This can be achieved by using a spray-drying method of the general kind disclosed in U.S. Pat. No. 4,421,674, the description of which is incorporated here as a reference, the method being modified so as to obtain a substrate having a low particle size and a relatively low content of alcoholic groups as required for the present catalyst.

Typically, a concentrated solution of magnesium chloride is first prepared in ethanol. Preferably the magnesium chloride used has a water content below or about 0.7% by weight. Preferably also, the solution is prepared by dissolving about 40 parts by weight of magnesium chloride per 100 parts by weight of ethanol, operating at about 130° C. and at a nitrogen pressure of about 5 bars. The solution is then supplied to a spray-drying apparatus in counter-current with a flow of gaseous nitrogen, the nitrogen having an inlet temperature of about 350° C. and an outlet temperature of about 230° C. The product obtained under these conditions is a magnesium chloride substrate containing alcoholic hydroxyls and typically having the following characteristics:

particle shape and size: spherical, at least 70% by weight of the particles having a diameter of 0.5 to 10 microns;

content of alcoholic hydroxyls: 3 to 15% by weight expressed as ethanol;

apparent density: 0.3 to 0.5 g/ml;
porosity: 0.6 to 0.8 ml/g, and
surface area: 2 to 20 m²/g.

In the preferred embodiment, at least 90% by weight of the particles have a diameter of 0.5 to 10 microns and the alcoholic hydroxyl content is about 10% by weight, expressed as ethanol.

A typical substrate according to the invention contains: 23% by weight Mg, 67% by weight Cl, and 10% by weight of alcoholic hydroxyls (expressed as ethanol).

Preparation of the activated substrate

The activated substrate is prepared by reacting the substrate with titanium tetrachloride until from 0.8 to 4.0% by weight of titanium expressed as metal has been fixed, and reducing the alcoholic hydroxyl content to values in the range from 0.02 to 4% by weight expressed as ethanol.

In the preferred embodiment, the solid substrate is suspended in liquid titanium tetrachloride, e.g. 70–80 parts by weight of the substrate are suspended in 100 parts by weight of titanium tetrachloride. The resulting suspension is then heated to a temperature of 80° to 100° C. for a time of 15 to 60 minutes.

The activated substrate is then separated from the excess titanium tetrachloride and the solid is washed until chlorine disappears from the washing liquor. A liquid paraffin such as n-decane can be used for this purpose.

Operation under the aforementioned conditions results in an activated support containing titanium and alcoholic hydroxyls and typically having the following characteristics:

particle shape and dimensions: similar to those of the substrate;
alcoholic hydroxyl content: 0.02 to 4% by weight expressed as ethanol;
titanium content: 0.8 to 4% by weight expressed as metal;
apparent density: similar to that of the substrate;
porosity: from 0.7 to 1 ml/g
surface area: from 10 to 100 m²/g.

In the preferred embodiment the activated substrate contains from 2 to 3% by weight of bonded titanium expressed as metal and from 0.6 to 3% by weight of alcoholic hydroxyls expressed as ethanol. A typical activated substrate according to the invention contains: 21% by weight of mg, 74.7% by weight of Cl, 2.3% by weight of Ti and 2% by weight of alcoholic hydroxyls (expressed as ethanol).

Preparation of the catalyst component

The catalyst component is prepared by reacting the activated substrate with an alkyl aluminium chloride so as to chlorinate the titanium and partially or completely reduce it from the tetravalent to the trivalent state.

Alkyl aluminium chlorides suitable for the purpose are chosen from among dialkyl aluminium chloride, alkyl aluminium dichloride and alkyl aluminium sesquichloride, the alkyl containing 2 to 4 carbon atoms.

Among these, the preferred substances are diethyl aluminium chloride, ethyl aluminium dichloride and ethyl aluminium sesquichloride. The most preferred compound is diethyl aluminium chloride.

The reaction is performed with an atomic ratio of 2/1 to 20/1 between aluminium (in the alkyl aluminium chloride) and titanium (in the activated substrate). The conditions of the reaction between alkyl aluminium chloride and the activated substrate are critical with regard to obtaining the solid catalyst component suitable for the purposes according to the invention.

More particularly it has been found that, at a given reaction temperature, there is a minimum time in which the reagents must remain in contact in order to give the desired characteristics to the solid catalyst component.

For example, at a reaction temperature of 0° C. to room temperature (20°–25° C.) the reaction time is conveniently about 100 hours, whereas when operating at 100°–120° C., only about 15 minutes are usually necessary to obtain the desired effect.

According to the invention, therefore, the reaction between the alkyl aluminium chloride and the activated substrate is usually carried on for times from about 15 minutes to about 100 hours and at reaction temperatures of about 120° C. to about 0° C.

In the preferred embodiment, however, the reaction is carried out for a time of 0.5 to 4 hours, operating at a temperature of 80° C. to 50° C. In the preferred embodiment also, use is made of an aluminium/titanium ratio as defined hereinbefore, of 4/1 to 10/1.

During the reaction between the alkyl aluminium chloride and the activated substrate, part or all the titanium is reduced from tetravalent to trivalent, and normally the solid catalyst component should contain a quantity of trivalent titanium equal to 20 to 50% of the total titanium.

During the reaction also, the titanium becomes chlorinated and bonds significant quantities of chlorine, as shown by the increase in the titanium-chlorine bonds in the ESR spectra.

In every case, operating in the previously-described manner, the product is a catalyst component typically having the following characteristics:

shape and size of particles: similar to those of the substrate;
alcoholic hydroxyl content: usually lower than 2% by weight expressed as ethanol;
titanium content: from 0.4 to 4.0% by weight expressed as metal;
ratio of trivalent titanium to the sum of trivalent and tetravalent titanium: from 0.2/1 to 0.5/1;
apparent density: similar to substrate;
porosity: 0.6 to 1.2 ml/g;
surface area: 20 to 120 m²/g.

In the preferred embodiment the catalyst component has a titanium content of 2 to 3% by weight, and the alcoholic hydroxyl content is below 1% by weight expressed as ethanol.

A typical catalyst component according to the invention contains: 21% by weight of Mg, 74% by weight Cl, 2.4% by weight Ti, 1.8% by weight Al and 0.8% by weight of alcoholic hydroxyls (expressed as ethanol).

In the best embodiment of the invention, the reaction between the alkyl aluminium chloride and the activated substrate is carried out in an inert solvent, e.g. a paraffin vehicle, more particularly liquid paraffin hydrocarbons containing more than 7 carbon atoms. The following are examples of the aforementioned liquid paraffin hydrocarbons: n-decane, n-undecane, n-dodecane and the commercial product ISOPAR G produced by EXXON and comprising $C_{10}$–$C_{12}$ branched isoparaffins.

The presence of the vehicle makes it easier to control the heat of the reaction and obtain the catalyst component in the form of a suspension which can be directly supplied to the tubular reactor.

The catalyst

The catalyst according to the invention comprises the aforementioned solid component and a trialkyl aluminium having a short alkyl chain.

More particularly, the trialkyl aluminium contains 2 to 4 carbon atoms in the alkyl group. Triethyl aluminium is particularly preferred among all the compounds in this class. Trialkyl aluminium containing an alkyl chain longer than the aforementioned maximum limit does not give satisfactory results in the method of preparing low-density straight-chain polyethylenes according to the invention.

The two catalyst components are supplied independently to the tubular reactor. In the preferred embodiment the solid catalyst component is supplied in the form of a suspension in the hydrocarbon vehicle as previously mentioned.

In all cases the two components are supplied at a rate such as to maintain an atomic ratio between the aluminium in the trialkyl aluminium and the titanium in the solid component at values usually in the range from 15/1 to 70/1 and preferably in the range from 15/1 to 45/1.

Advantageously the trialkyl aluminium is supplied to the reactor in the form of a solution in a hydrocarbon solvent, e.g. in the previously-mentioned product ISOPAR G.

Polymerisation

When preparing low-density straight-chain polyethylene, ethylene is copolymerised with an alpha-olefin containing 4 to 8 atoms of carbon in the molecule, in the presence of the previously-described catalyst in a tubular reactor operating at high pressure and temperature and with relatively short residence times under the polymerisation conditions.

More particularly the general reaction conditions are:
temperature: 100° to 280° C.
pressure: 1200 to 2000 bars and
residence time: 25 to 60 seconds.

Under these conditions, it is possible to obtain a low or medium-density straight-chain polyethylene which usually has characteristics within the following ranges of values when butene-1 is used as the comonomer of ethylene:

density: 0.915 to 0.940 g/ml (method ASTM-D 2839);
melting index: 0.6 to 25 g/10' (condition E, method ASTM-D 1238, procedure A)
shear sensitivity—28 to 23 (method ASTM-D 1238)
content of butene-1: from 2 to 8% by weight (determined in IR) (method ASTM-D 2238-69)
impact: 50 to 100 g (method ASTM-B 1709)
Haze: 5–9 (method ASTM-D 1003)
stretch: 4 to 6 (microns)
colour: from A to B.

The stretch values are determined at a constant flow of polymer (30 revolutions of the screw per minute) and by constantly increasing the speed of the stretching roller (from 25 rpm to up to 120 rpm) until the film breaks. The test is then repeated when the speed of the stretching roller is slightly lower than the breaking speed. This speed is maintained for 5 minutes. If no tear occurs after this time, the film is measured with a micrometer and the measured thickness is expressed in microns.

The colour values are determined by the modified method ASTM-D 1725, by comparing the polyethylene under test with polyethylenes having known colours mentioned by the aforementioned standard method. The reference polyethylenes are assigned conventional colour values on a scale from A to D.

Finally, the low-density straight-chain polyethylene obtainable with the catalyst and the method according to the invention does not produce any odour during the phase of conversion into a film.

It is also possible, when operating according to the invention, to vary the density of the resulting polymer within the stated range, mainly by varying the alpha-olefin and the quantity of alpha-olefin copolymerised with ethylene. These copolymers usually have an alpha-olefin content which can vary from 2 to 8% by weight.

The alpha-olefin preferred for the purposes of the invention is butene-1. In the preferred embodiment, the tubular reactor is supplied with a mixture of ethylene, butene-1 and hydrogen (which acts as a molecular weight regulator), the molar ratio between ethylene and butene-1 being from 70–30 to 40–60.

When operating under the previously-mentioned general conditons and using the catalyst according to the invention, the products are low-density linear polyethylenes in quantities of about 200,000 g per gram of titanium in the catalyst.

Besides having high activity and productivity, the catalyst according to the invention shows little tendency to decomposition causing side-reactions. Finally, when suspended in the inert vehicle, the catalyst can easily be supplied to and metered in the polymerisation reactor.

The following experimental examples non-limitatively illustrate the invention.

EXAMPLE 1

Preparation of the substrate 40 kg magnesium chloride in the form of flakes (water content below 0.7% by weight) were dissolved in 100 kg ethanol (water content below 0.2% by weight), operating at 130° C. at a nitrogen pressure of 5 bars.

The solution was supplied at the same temperature and pressure to a spray-drying apparatus of the "Closed Cycle Drying" type produced by Messrs. NIRO, operating in cocurrent and with complete recovery of the evaporated organic solvent.

In this apparatus the solution was reduced to droplets, operating with a stream of gaseous nitrogen at an inlet temperature of 350° C. and an outlet temperature of 225°–235° C.

Under these conditions, a granular solid having the following characteristics collected at the bottom of the spray drier:

shape and size of particles: spherical, about 90% by weight of the particles having a diameter of 0.5 to 10 microns;

alcoholic hydroxyl content: 10% by weight, expressed as ethanol;

apparent density: 0.4 g/ml;

porosity: 0.7 ml/g;

surface area: 3 $m^2$/g.

Preparation of activated substrate 45 kg of the substrate obtained as described hereinbefore were suspended in 60 kg titanium tetrachloride. The mixture was heated to 100° C. for 30 minutes. At the end of this period the mixture was cooled, the unreacted titanium tetrachloride was filtered and the solid was washed with n-decane until chlorine disappeared from the washing liquid.

The product was an activated substrate having the following characteristics:

particle shape and dimensions: similar to those of the substrate;

alcoholic hydroxyl content: 2.5% by weight expressed as ethanol;

titanium content: 2.3% by weight expressed as metal;

apparent density: similar to that of substrate;

porosity: similar to that of substrate;

specific surface area: 18 $m^2$/g.

Preparation of the catalyst component 45 kg of activated substrate obtained as described hereinbefore were suspended in 100 liters of $C_{10}$–$C_{12}$ isoparaffins (ISOPAR G). The substance was heated to 70° C. and kept agitated while adding 18 kg of diethyl aluminium chloride gradually during an hour. At the end of this operation, the substance was kept agitated at 70° C. for a further hour.

The substance obtained was the catalyst component in the form of solid particles suspended in the liquid vehicle. The solid in particles had the following characteristics:

particle shape and size: similar to that of the substrate;

alcoholic hydroxyl content: 0.8% by weight expressed as ethanol;

titanium content: 2.3% by weight expressed as metal;

ratio of titanium in the trivalent state to the sum of titanium in the trivalent and tetravalent state: 0.35/1;

apparent density: similar to that of the substrate;

porosity: 0.8 g/ml;

surface area: 26 m$^2$/g.

EXAMPLE 2

A steel tubular reactor was used with an inner diameter of 1 inch (2.54 cm) and a length of 460 meters and equipped with temperature-control exchangers. One end of the reactor was supplied, via an alternating compressor, with a stream of 12 tons/hour of a mixture of ethylene, butene-1 and hydrogen, the molecular ratio of ethylene to butene-1 being about 50:50 and the quantity of hydrogen being 2000 vpm parts per million by volume) of the total amount of gas.

The same end of the reactor was supplied with the suspension of solid catalyst component prepared as described in Example 1, using a booster pump, in quantities of 25 l/hour of suspension containing 20 g/l of catalyst component suspended in the mixture of $C_{10}$–$C_{12}$ isoparaffin ISOPAR G.

Upstream of the place for inserting the aforementioned suspension, the reactor end was also supplied, using a booster pump, with triethyl aluminium in the form of a 10% by weight solution in ISOPAR G. More particularly, 6–8 l/hour of solution was supplied so that at the inlet the atomic ratio of aluminium in the triethyl aluminium to titanium in the solid catalyst component was around 50.

Polymerisation was carried out under the following conditions:

Pressure at reactor inlet: 1500 bars

Pressure drop in reactor: 200 bars

Inlet temperature: 60° C.

Triggering temperature: 100° C.

Peak temperature: 250° C.

Residence time: 30 seconds.

Near the reactor outlet, 2.5 l/hour of glycerol were supplied to inactivate the catalyst.

When operating under the aforementioned conditions the conversion rate, calculated as ethylene, was about 55% by weight. At the reactor outlet, the polymer was recovered by a multi-stage flash, the polymer being directly supplied from the flash to the extruder.

Unreacted monomers and hydrogen were recycled to the reactor inlet after purification and combining with the previously-mentioned supply monomers.

During a 30-day uninterrupted period of operation, the average yield was 2300 kg/hour of a low-density straight-chain polyethylene (200,000 g per g of titanium in the catalyst) having the following characteristics:

Density: 0.9200–0.9205 g/ml

Melting index: 1.0–1.1 g/10'

Shear sensitivity: 28

Content of butene-1: 3.0–3.2% in mols

Impact: 80–100 g

Haze: 6–8

Stretch: 5–6 microns

Colour: A-B

Odour on polymer product: standard

No odour during film-forming phase.

EXAMPLE 3

(Comparison)

The solid catalyst component was prepared exactly as described in Example 1 with regard to the preparation of the substrate and the preparation of the activated substrate.

15 kg of activated substrate were then suspended in 600 l of ISOPAR G. The subtance was kept agitated at ambient temperature (20°–25° C.) and 40 liters of 30% by weight solution of diethyl aluminium chloride in ISOPAR G were added in about an hour. At the end of this process the substance was kept agitated at the same temperature for a further hour.

The result was a solid catalyst component in the form of solid particles suspended in the liquid vehicle.

The solid in particles had the following characteristics:

Shape and size of particles: similar to those of the substrate;

Alcoholic hydroxyl content: 2% by weight, expressed as ethanol;

Titanium content: 2.3% by weight expressed as metal;

Ratio of titanium in the trivalent state to the sum of the titanium in the trivalent and tetravalent state: 0.15/1;

Apparent density: similar to that of the substrate;

Porosity: 1 ml/g;

Surface area: 30 m$^2$/g

EXAMPLE 4

(Comparison)

Polymerisation was carried out similarly to Example 2, using the solid catalyst component described in Example 3.

One end of the reactor was supplied with a stream of 12 tons/hour of a mixture of ethylene, butene-1 and hydrogen, the molar ratio of ethylene and butene-1 being 50–50 and the quantity of hydrogen being 600 vpm of the total gas. The same end of the reactor was supplied with 20 l/hour of the suspension of solid catalyst component prepared as described in Example 3 and containing 25 g/l of the solid component Further upstream, a 10% by weight solution of triethyl aluminium in ISOPAR G was supplied at a rate of 8–10 l/hour.

Polymerisation was carried out under the following conditions:

Pressure at reactor inlet: 1500 bars

Pressure drop in reactor: 200 bars

Inlet temperature: 60° C.

Triggering temperature: 120° C.

Peak temperature: 235° C.

Residence time: 30 seconds.

Near the reactor outlet, 4 l/hour glycerol had to be supplied in order completely to inactivate the catalyst.

Unreacted monomers and hydrogen were recycled to the reactor inlet after purification and incorporation of fresh monomers.

Under these conditions the initial conversion rate of ethylene was 36% and 1500 kg/hour of polymer were obtained (160,000 g per g of titanium).

In order to maintain this conversion rate it was necessary gradually to increase the amount of trietyl aluminium, only a few hours after starting the experiment. The amount of 10% solution of triethyl aluminium in ISOPAR G rose to 18–20 l/hour after 10 days, when the reaction was stopped.

The polymer obtained during this time had the following average characteristics:

Density: 0.9210 g/ml

Melting index: 0.9–1 g/10'

Content of butene-1: 3.1% in mols

Impact: 80–100 g

Haze: 6.2

Stretch: 5 microns

Colour: A-B

Odour in the polymer product: standard

Hydrocarbon odour during formation of polymer film.

EXAMPLE 5

(Comparison)

The solid catalyst component was prepared exactly as described in Example 1, with regard to the preparation of the substrate and the preparation of the activated substrate.

45 kg of the resulting activated substrate were thereupon suspended in 1800 l of a mixture of $C_{10}$–$C_{12}$ isoparaffins (ISOPAR G).

The substance was kept agitated at 20°–25° C. and 85 kg of a 30% by weight solution of tri-n-octyl aluminium was added, followed by 48 kg of a 30% by weight solution of diethyl aluminium chloride in the same $C_{10}$–$C_{12}$ isoparaffin solvent.

At the end of the addition process the substance was kept agitated at the same temperature for an hour.

The result was a solid catalyst component in the form of solid particles in the liquid vehicle.

The solid in particles had the following characteristics:

Shape and size of particles: similar to those of the substrate;

Alcoholic hydroxyl content: 1.8% by weight expressed as ethanol;

Titanium content: 2.3% by weight expressed as metal;

Ratio of titanium in the trivalent state to the sum of the titanium in the trivalent and tetravalent state: 0.20/1;

Apparent density: similar to that of the substrate;

Porosity: 0.9 ml/g;

Surface area: 29 $m^2$/g.

EXAMPLE 6

(Comparison)

Use was made of a steel tubular reactor having an internal diameter of 1.25 inches (3.175 cm) and a length of 600 m, equipped with temperature-control exchangers. One end of the reactor was supplied with a stream of 15,500 kg/hour of a mixture of ethylene, butene-1 and hydrogen, the molar ratio of ethylene to butene-1 being 50:50 and the quantity of hydrogen being 1000 vpm with respect to the total gas.

The same end of the reactor was supplied with 34 l/hour of the suspension of solid catalyst component prepared in Example 5, containing 25 g/l of the solid component. A place upstream was simultaneously suplied with a 30% by weight solution of tri-n-octyl aluminium in $C_{10}$–$C_{12}$ isoparaffins, using a booster pump, at a rate of 50 liters/hour.

Polymerisation was carried out under the following conditons:

Pressure at reactor inlet: 1400 bars

Pressure drop in reactor: 200 bars

Temperature at inlet: 60° C.

Triggering temperature: 125° C.

Peak temperature: 230° C.

Residence time: 55 seconds.

Near the reactor outlet, 7 liters/hour of diethylene glycol had to be supplied in order completely to inactivate the catalyst.

When operating under the aforementioned conditions, the initial conversion rate, expressed as ethylene, was 34%, with an output of 1950 kg/hour (100,000 g per g titanium) of a polymer having the following characteristics:

Density: 0.9200 g/ml

Melting index: 1.0 g/10'

Shear sensitivity: 29.0

Content of butene-1: 3% in mols

Impact: 80 g

Haze: 15

Stretch: 5 microns

Colour: C-D (from yellow to deep yellow)

Odour in polymer product: pungent and permanent during film formation.

We claim:

1. A catalyst comprising a trialkyl aluminum and a titanium-containing solid catalyst component, wherein the trialkyl aluminum contains from 2 to 4 carbon atoms in the alkyl group and wherein the titanium-containing solid catalyst component is obtained by:

spray-drying an ethanolic solution consisting essentially of magnesium chloride to form a substrate of solid particles of magnesium chloride containing alcoholic hydroxyls, at least 70% by weight of the particles having a size in the range from 0.5 to 10 microns and the alcoholic hydroxyl content varying from 3 to 15% by weight expressed as ethanol;

reacting the substrate with titanium tetrachloride to form an activated substrate having a bonded titanium content of 0.8 to 4.0% by weight, expressed as metal, and an alcoholic hydroxyl content of 0.02 to 4% by weight expressed as ethanol, and reacting the activated substrate with an alkyl aluminum chloride having an atomic ratio of 2/1 to 20/1 between the aluminum in the alkyl aluminum chloride and the titanium in the activated substrate, in a hydrocarbon diluent at a temperature of from 50° C. to 80° C. and for a time of from 0.5 hours to 4.0 hours, to chlorinate the titanium and reduce the titanium from the tetravalent state to the trivalent state so that the quantity of titanium in the trivalent state is between 20% and 50% of the total of the titanium in the trivalent state and the titanium in the tetravalent state.

2. A catalyst according to claim 1, wherein the titanium is completely reduced from the tetravalent state to the trivalent state.

3. A catalyst according to claim 1, wherein the titanium in the trivalent state is present in an amount of between 20% and 50% by weight of the total titanium.

4. A method of preparing low or medium-density straight-chain copolymers of ethylene and $C_4$–$C_6$ alpha-olefins, operating at a temperature of 100° C. to 280° C., and a pressure of 1200 to 2000 bars at a residence time of 25 to 60 seconds in a tubular reactor and in the presence of a Ziegler catalyst comprising a trialkyl aluminum and a solid catalyst component containing titanium, characterised in that the trialkyl aluminum contains from 2 to 4 carbon atoms in the alkyl groups and the solid titanium-containing component is obtained;

by spray-drying an ethanolic solution consisting essentially of magnesium chloride to form a substrate of solid particles of magnesium chloride containing alcoholic hydroxyls, at least 70% by weight of the particles having a size in the range from 0.5 to 10 microns and the alcoholic hydroxyl content varying from 3 to 15% by weight expressed as ethanol;

by reacting the substrate with titanium tetrachloride to form an activated substrate having a bonded titanium content of 0.8 to 4.0% by weight, expressed as metal, and an alcoholic hydroxyl content of 0.02 to 4% by weight expressed as ethanol, and by reacting the activated substrate with an alkyl aluminum chloride having an atomic ratio of 2/1 to 20/1 between the aluminum in the alkyl aluminium chloride and the titanium in the activated substrate, in a hydrocarbon diluent at a temperature of from 50° C. to 80° C. and for a time of from 0.5 hours to 4.0 hours, to chlorinate the titanium and reduce the titanium from the tetravalent state to the trivalent state whereby the quantity of titanium in the trivalent state is between 20% and 50% of the total of the titanium in the trivalent state and the titanium in the tetravalent state;

the atomic ratio between the aluminum in the trialkyl aluminum and the titanium in the solid catalyst component being in the range from 15/1 to 70/1.

5. A method according to claim 4, characterised in that the trialkyl aluminium is triethyl aluminium and the atomic ratio between the aluminium in the triethyl aluminium and the titanium in the solid catalyst component is in the range from 15/1 to 45/1.

6. A method according to claim 4, characterised in that in the substrate at least 90% by weight of the particles have a diameter of 0.5 to 10 microns, the alcoholic hydroxyl content being about 10% by weight expressed as ethanol.

7. A method according to claim 4, characterised in that the activated substrate has a bonded titanium content of 2 to 3% by weight and a quantity of alcoholic hydroxyls of 0.6 to 3% by weight expressed as ethanol.

8. A method according to claim 4, characterised in that when preparing the solid catalyst component, the alkyl aluminium chloride is chosen from among diethyl aluminium chloride, ethyl aluminium dichloride and ethyl aluminium sesquichloride, and the reaction with the activated substrate occurs during a time form 0.5 to 4 hours at a temperature of 80° to 50° C. operating in a hydrocarbon diluent.

9. A method according to claim 4, characterised in that the solid catalyst component has a titanium content of 2 to 3% by weight, and an alcoholic hydroxyl content below 1% by weight expressed as ethanol and a quantity of titanium in the trivalent state of 35 to 50% of the total titanium in the trivalent state and the titanium in the tetravalent state.

10. A method according to claim 4, characterised in that ethylene is copolymerised with butene-1, operating at temperatures of 100° to 280° C., pressures of 1200 to 2000 bars and residence times of 25 to 60 seconds.

11. A method according to claim 10, characterised in that the molar ratio between ethylene and butene-1 in the supply varies from 70/30 to 40/60.

12. A method according to claim 10, characterised in that it is carried out in the presence of hydrogen.

13. A method according to claim 4, wherein said reaction of said catalyst substrate with said titanium tetrachloride occurs at a temperature of about 80° to about 100° C. for a time of about 15 to about 60 minutes.

14. A method according to claim 4, wherein said catalyst component has an alcoholic hydroxyl content lower than about 2% by weight evaluated as ethanol, a titanium content from about 0.4 to about 4.0% by weight evaluated as metal, a porosity of about 0.6 to about 1.2 milliliter per gram, and a surface area of about 20 to about 120 square meters per gram.

15. A method according to claim 4, further comprising preparing said ethanolic solution of magnesium chloride by dissolving about 40 parts by weight of magnesium chloride per 100 parts by weight of ethanol at about 130° C. and at a nitrogen pressure of about 5 bars.

16. A method according to claim 4, characterized in that the solid catalyst component has a titanium content of 2 to 3% by weight, an alcoholic hydroxyl content below 1% by weight expresses ethanol, and a quantity of titanium in the trivalent state of 20 to 50% of the total titanium in the trivalent state and the titanium in the tetravalent state.

* * * * *